(12) United States Patent
Holtan et al.

(10) Patent No.: US 10,337,146 B2
(45) Date of Patent: Jul. 2, 2019

(54) MICROFIBRILLATED CELLULOSE

(71) Applicant: Borregaard AS, Sarpsborg (NO)

(72) Inventors: Synnøve Holtan, Sarpsborg (NO); Marianne Rosenberg Read, Sarpsborg (NO); Hans Henrik Øvrebø, Sarpsborg (NO); Inger Mari Nygård Vold, Sarpsborg (NO)

(73) Assignee: Borregaard AS, Sarpsborg (NO)

( * ) Notice: Subject to any disclaimer, the term of this patent is extended or adjusted under 35 U.S.C. 154(b) by 0 days.

(21) Appl. No.: 15/311,730

(22) PCT Filed: May 29, 2015

(86) PCT No.: PCT/EP2015/001103
§ 371 (c)(1),
(2) Date: Nov. 16, 2016

(87) PCT Pub. No.: WO2015/180844
PCT Pub. Date: Dec. 3, 2015

(65) Prior Publication Data
US 2017/0121908 A1 May 4, 2017

(30) Foreign Application Priority Data
May 30, 2014 (EP) .................................... 14001882

(51) Int. Cl.
*C08L 1/02* (2006.01)
*D21B 1/06* (2006.01)
(Continued)

(52) U.S. Cl.
CPC ......... *D21H 11/18* (2013.01); *B01F 17/0028* (2013.01); *C08L 1/02* (2013.01);
(Continued)

(58) Field of Classification Search
CPC ........... D21H 11/18; D21C 9/007; C08L 1/02; D21D 1/20; C08B 15/02; D21B 1/06;
(Continued)

(56) References Cited

U.S. PATENT DOCUMENTS 4,374,702 A * 2/1983 Turbak ..................... D01D 5/11
162/100
4,481,076 A * 11/1984 Herrick .................. D21C 9/002
162/100
(Continued)

FOREIGN PATENT DOCUMENTS

EP 2196579 A1 6/2010
JP 2011-26760 A 2/2011
(Continued)

OTHER PUBLICATIONS

International Search Report for PCT/EP2015/001103, 3 pages (dated Jul. 2, 2015).
(Continued)

*Primary Examiner* — Jose A Fortuna
(74) *Attorney, Agent, or Firm* — Choate, Hall & Stewart LLP

(57) ABSTRACT

The present invention relates to microfibrillated cellulose ("MFC"), in particular to microfibrillated cellulose, which is morphologically different from conventional MFC known in the art and/or which provides improved water retention properties and/or improved rheological properties, in particular increased zero shear viscosity, $\eta_o$, (also known as: "viscosity at rest", i.e. viscosity in the absence of shear forces), in solution, in particular in polyethylene glycol (PEG) as solvent, vis-a-vis conventional MFC as known in the art.

13 Claims, 6 Drawing Sheets

(51) Int. Cl.
    *D21C 9/00* (2006.01)
    *D21D 1/20* (2006.01)
    *B01F 17/00* (2006.01)
    *D21H 11/18* (2006.01)
(52) U.S. Cl.
    CPC ............... *D21B 1/06* (2013.01); *D21C 9/007* (2013.01); *D21D 1/20* (2013.01)
(58) Field of Classification Search
    CPC ....... D21B 1/30; B82Y 30/00; Y10T 428/298; B01F 17/0028
    See application file for complete search history.

(56) References Cited

U.S. PATENT DOCUMENTS

| | | | | |
|---|---|---|---|---|
| 4,481,077 | A * | 11/1984 | Herrick | D21C 9/001 162/100 |
| 4,483,743 | A * | 11/1984 | Turbak | D01D 5/11 162/100 |
| 5,964,983 | A * | 10/1999 | Dinand | C09K 8/206 162/187 |
| 6,183,596 | B1 * | 2/2001 | Matsuda | D21C 9/007 162/100 |
| 6,214,163 | B1 * | 4/2001 | Matsuda | D21C 9/007 162/100 |
| 7,381,294 | B2 * | 6/2008 | Suzuki | D21D 1/20 162/102 |
| 8,444,808 | B2 | 5/2013 | Koslow et al. | |
| 8,945,346 | B2 | 2/2015 | Bjoerkqvist et al. | |
| 9,051,684 | B2 * | 6/2015 | Hua | D21D 1/20 |
| 9,797,093 | B2 * | 10/2017 | Laukkanen | C08B 15/00 |
| 2008/0057307 | A1 | 3/2008 | Koslow et al. | |
| 2009/0221812 | A1 * | 9/2009 | Ankerfors | D21H 11/18 536/56 |
| 2012/0043039 | A1 * | 2/2012 | Paltakari | D21H 11/18 162/157.6 |
| 2012/0090192 | A1 * | 4/2012 | Oevreboe | F26B 5/06 34/285 |
| 2012/0107480 | A1 | 5/2012 | Gane et al. | |
| 2014/0370179 | A1 * | 12/2014 | Gane | B82Y 30/00 426/573 |
| 2015/0090412 | A1 * | 4/2015 | Sabourin | D21C 9/001 162/9 |
| 2015/0322170 | A1 * | 11/2015 | Haggblom | C08L 1/02 536/56 |
| 2016/0024718 | A1 * | 1/2016 | Lee | D21H 11/18 162/9 |
| 2016/0176989 | A1 * | 6/2016 | Laukkanen | C08B 15/04 162/157.6 |
| 2016/0186376 | A1 * | 6/2016 | Nuopponen | D21C 9/007 162/57 |
| 2016/0289893 | A1 * | 10/2016 | Martin | B82Y 40/00 |
| 2017/0067207 | A1 * | 3/2017 | Malkki | A61L 15/28 |
| 2017/0073893 | A1 * | 3/2017 | Bilodeau | D21D 1/30 |
| 2017/0121908 | A1 * | 5/2017 | Holtan | D21H 11/18 |
| 2017/0211230 | A1 * | 7/2017 | Nuopponen | D21B 1/14 |
| 2017/0226692 | A1 * | 8/2017 | Zhu | D21B 1/021 |
| 2017/0331093 | A1 * | 11/2017 | Kim | H01M 2/1626 |
| 2018/0021473 | A1 * | 1/2018 | Yliperttula | A61L 17/145 |
| 2018/0078484 | A1 * | 3/2018 | Blell | A61K 8/731 |
| 2018/0274173 | A1 * | 9/2018 | Holtan | D21D 1/20 |

FOREIGN PATENT DOCUMENTS

| | | | |
|---|---|---|---|
| WO | WO-2007/091942 A1 | 8/2007 | |
| WO | WO-2015180844 A1 * | 12/2015 | ............... D21D 1/20 |

OTHER PUBLICATIONS

Written Opinion for PCT/EP2015/001103, 6 pages (dated Jul. 2, 2015).

* cited by examiner

Figure 1a (MFC according to the prior art, magnification 40 x)
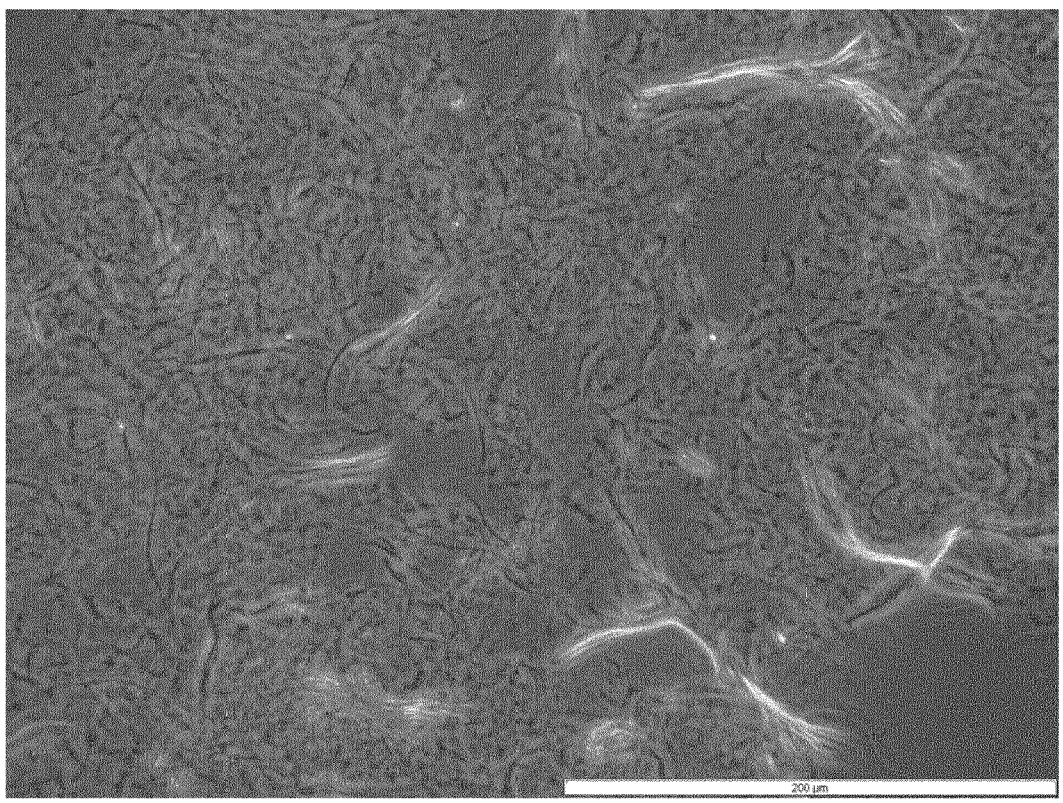

Figure 1b (MFC according to the prior art; magnification 100 x)
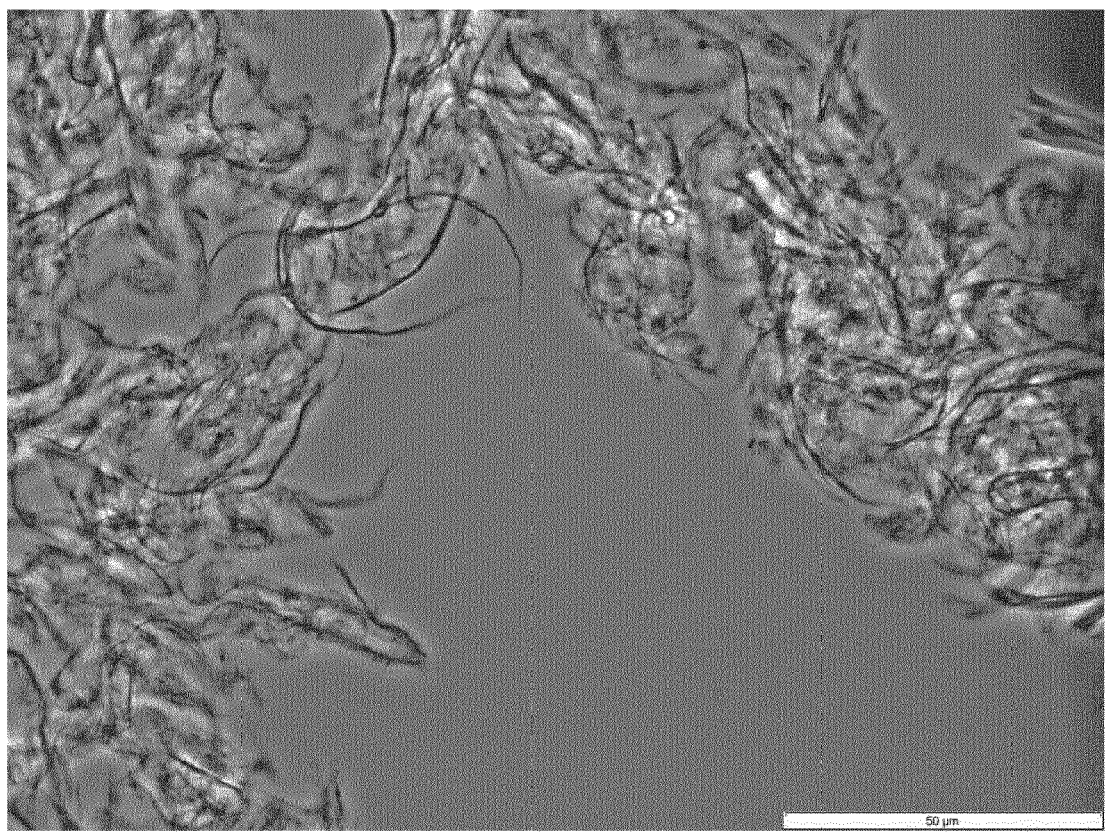

Figure 2 (MFC in accordance with the invention, magnification: 40 x)
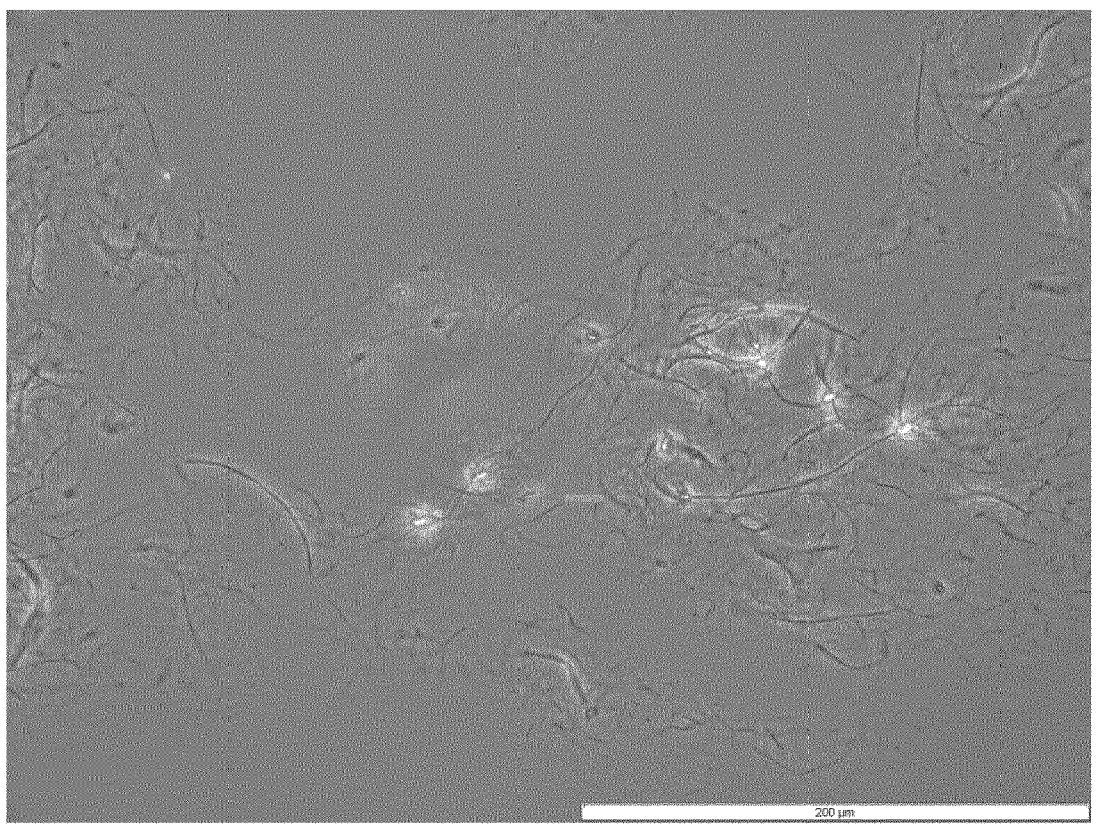

Figure 3 (MFC in accordance with the invention; magnification: 100 x)
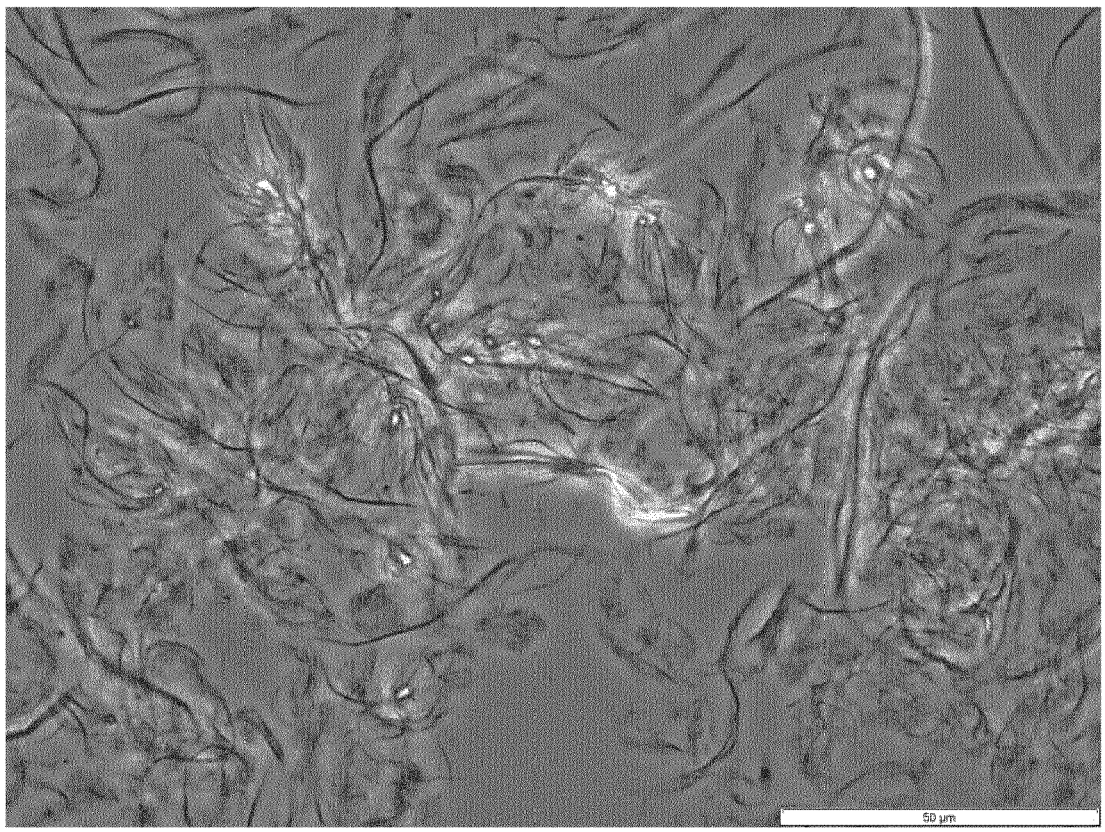

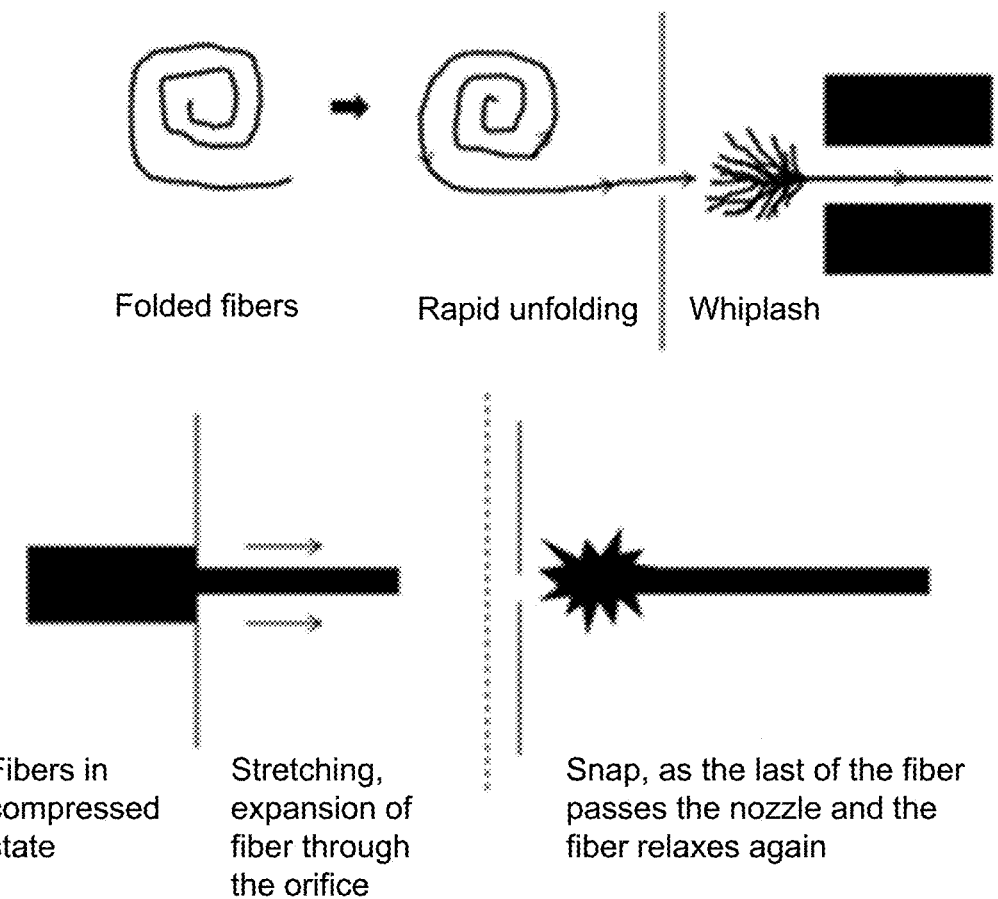
Figure 4: proposed mechanism

MICROFIBRILLATED CELLULOSE

CROSS-REFERENCE TO RELATED APPLICATIONS

This patent application is a National Stage Entry of International Patent Application No. PCT/EP2015/001103, filed on May 29, 2015, which claims the benefit of priority of European patent application No. 14001882.1, filed on May 30, 2014, the contents of each of which are hereby incorporated by reference in their entirety for all purposes herein.

FIELD

The present invention relates to microfibrillated cellulose ("MFC"), in particular to microfibrillated cellulose, which is morphologically different from conventional MFC known in the art. The novel MFC provides improved water retention properties and/or improved rheological properties, in particular increased zero shear viscosity, $\eta_o$, (also known as: "viscosity at rest", i.e. viscosity in the absence of shear forces), in solution vis-à-vis conventional MFC as known in the art.

The present invention also relates to a process and a homogenizer for making the MFC according to the present invention, which is morphologically different from the MFC known in the art.

BACKGROUND

Microfibrillated cellulose (MFC) in accordance with the present invention relates to cellulose fibers that have been subjected to a specific mechanical treatment in order to increase the specific surface and to reduce the size of cellulose fibers in terms of cross-section (diameter) and/or length, wherein said size reduction preferably leads to a fibril diameter in the nanometer range and a fibril length in the micrometer range.

Microfibrillated cellulose (also known as "reticulated" cellulose or as "superfine" cellulose, or as "cellulose nanofibrils", among others) is described, for example, in U.S. Pat. Nos. 4,481,077, 4,374,702 and 4,341,807. According to U.S. Pat. No. 4,374,702 ("Turbak"), microfibrillated cellulose has properties distinguishing the same from previously known cellulose products.

MFC in accordance with the "Turbak" process (see FIG. 5, Technology B) is produced by passing a liquid suspension of cellulose through a small diameter orifice in which the suspension is subjected to a pressure differential and high velocity shearing impact, followed by a high velocity decelerating impact, until the cellulose suspension becomes substantially stable. This process converts the cellulose into microfibrillated cellulose without inducing substantial chemical change to the cellulose as such. The microfibrillated cellulose is present in the form of individual fibrils or as fibril bundles (fibrils arranged together in a bundle).

An improved process for obtaining particularly homogeneous MFC is described in WO 2007/091942.

A representative depiction of conventional MFC as known from the art is shown in an optical microscopy photograph in FIG. 1. The corresponding process known from the art as used to obtain this conventional MFC is shown schematically in FIG. 5 (Technology C).

Due to the large surface area and high aspect ratio (ratio of fibril length to fibril width), microfibrillated cellulose generally has a good ability to form stable three-dimensional networks, in solution (including water and organic solvents). In solution, MFC typically forms a highly viscous gel-like dispersion with shear thinning properties. This means, among others, that microfibrillated cellulose has a good ability to stabilize dispersions in a stationary state, while, at the same time, rendering the dispersion easier to process, for example in regard to pumping. This is because the viscosity of the MFC dispersion is reduced when shear forces are applied. As a consequence, zero shear viscosity, $\eta_o$, is comparatively high, while the viscosity at high shear is comparatively reduced.

However, the MFC known from the art, while showing shear thinning properties, has limitations in regard to water retention (capability to retain water) and/or in regard to the degree of zero shear viscosity, $\eta_o$, that can be reached in certain solvents, for example in polyethylene glycol (PEG). This deficiency becomes apparent, in particular, in high performance applications of MFC in coatings, paints, adhesives, cosmetics, home care products, pharmaceuticals (ointments) etc.

It is therefore an object of the present invention to provide microfibrillated cellulose, which shows improved rheological properties in dispersion in a solvent, in particular in polyethylene glycol (PEG), and/or microfibrillated cellulose which has improved water retention properties, in dispersion, among others.

SUMMARY

In one aspect of the present invention, and solving the object(s) outlined above, the microfibrillated cellulose according to the present invention is prepared and obtainable by a process, which comprises at least the following steps: (a) subjecting a cellulose pulp to at least one mechanical pretreatment step; (b) subjecting the mechanically pretreated cellulose pulp of step (a) to a homogenizing step, which results in fibrils and fibril bundles of reduced length and diameter vis-à-vis the cellulose fibers present in the mechanically pretreated cellulose pulp of step (a), said step (b) resulting in microfibrillated cellulose; wherein the homogenizing step (b) involves compressing the cellulose pulp from step (a) and subjecting the cellulose pulp to a pressure drop, by expanding the cellulose through at least one orifice, providing a pressure drop between a volume segment, preferably a chamber, that is located upstream of said orifice, and another volume segment, preferably a chamber, that is located downstream of said orifice, area, wherein said pressure drop is at least 1000 bar, preferably more than 2000 bar, preferably more than 2500 bar, further preferably more than 3000 bar, and wherein the cellulose fibrils are subjected to a turbulent flow regime in said volume segment, preferably a chamber, that is located downstream of said orifice.

In the homogenizing step (b), which is to be conducted after the (mechanical) pretreatment step, in accordance with the present invention, the cellulose pulp slurry from step (a) is passed through a homogenizer at least once, preferably at least two times.

The homogenizer in accordance with the present invention is a high pressure homogenizer comprising at least one volume segment, preferably a chamber, which is located upstream of an orifice, at least one orifice having a small diameter, and at least one volume segment, preferably at least one chamber, which is located downstream of the orifice, in which the (microfibrillated) cellulose is subjected to an area of turbulent flow, i.e. a turbulence regime (i.e. a non-laminar flow).

In accordance with the present invention, the term "orifice" means an opening or a nozzle contained in a homogenizer suitable for homogenizing cellulose, and having a defined or definable geometry, characterized, in particular, by a diameter or another suitable dimension.

In a preferred embodiment, the diameter of the orifice used in the homogenization step(s) is from 100 μm to 700 μm, further preferably from 200 μm to 500 μm.

The velocity of the cellulose pulp as determined immediately after said orifice is at least 200 m/s, further preferably more than 500 m/s and most preferably more than 700 m/s.

The residence time of a given flow segment comprising the cellulose fibers in the small diameter orifice, in accordance with the present invention, is comparatively short, preferably less than 20 microseconds, further preferably less than 10 microseconds and most preferably less than 2 microseconds.

In particular, the homogenizing step (b) involves compressing the cellulose pulp from step (a) and subjecting the cellulose pulp to a pressure drop, and thereby expanding the cellulose through said small diameter orifice and subjecting the cellulose fibers/fibrils to a subsequent turbulence flow volume segment by means of providing a pressure differential between said upstream volume segment and a downstream volume segment, with the orifice located between these two segments.

The above-discussed objects, and other objects, are achieved by microfibrillated cellulose, in which: i) the length and the diameter of the cellulose fibrils and fibril bundles are reduced vis-à-vis the respective length and diameter of the cellulose fibers and fiber bundles making up the cellulose that was used as a starting product; ii) at least a fraction of the fibril bundles and individual fibrils of the microfibrillated cellulose, having reduced length and diameter, has bifurcations on at least one end of the main fibrils, into secondary fibrils, preferably bifurcations into three or more secondary fibrils, further preferably bifurcations into four or five or more secondary fibrils, wherein said secondary fibrils have a smaller diameter than the non-bifurcated main fibril, wherein the number of said (multiply) bifurcated ends of fibrils/fibril bundles is at least 60 (multiply) bifurcated ends of fibrils ("whiplash/brush like end structures") per mm$^2$, as measured in accordance with the optical light microscopy method as described herein, at a magnification of 40 times, preferably at least 80 (multiply) bifurcated ends of fibrils per mm$^2$, further preferably at least 100 or at least 140 (multiply) bifurcated ends of fibrils per mm$^2$.

Alternatively, these and other objects are achieved by microfibrillated cellulose, in which: i) the length and the diameter of the cellulose fibrils and fibril bundles are reduced vis-à-vis the respective length and diameter of the cellulose fibers and fiber bundles making up the cellulose that was used as a starting product; ii) at least a fraction of the fibril bundles and individual fibrils of the microfibrillated cellulose, having reduced length and diameter, has (multiple) bifurcations on at least one end of the main fibril into secondary fibrils, preferably bifurcations into three or more or four or more secondary fibrils wherein said secondary fibrils have a smaller diameter than the non-bifurcated main fibril, wherein the ratio of the number of such (multiply) bifurcated ends of fibrils/fibril bundles ("whiplash/brush like end structures") of the microfibrillated cellulose in accordance with the present invention relative to the number of such (multiply) bifurcated ends of fibrils/fibril bundles of a reference microfibrillated cellulose, that has been homogenized in a conventional Microfluidics homogenizer, in accordance with the process as described herein, is at least 5, preferably at least 10, further preferably at least 15, wherein the number of (multiply) bifurcated ends of fibers/fibrils, fibril bundles is measured, for both types of microfibrillated cellulose, in accordance with the optical light microscopy method as described herein, at a magnification of 40 times.

BRIEF DESCRIPTION OF THE DRAWINGS

The invention is described in more detail in the following, with reference to the enclosed figures, which are only meant to be illustrative, wherein:

FIG. 1a shows a microscopy image (magnification: 40×) of MFC as obtained in accordance with a process known from the art (0.17% of MFC, by weight, in water; obtained in a Microfluidics homogenizer as schematically shown in FIG. 5, Technology C, and as obtained in accordance with Comparative Example 2);

FIG. 1b shows MFC as shown in FIG. 1a, but now at a magnification of 100×;

FIG. 2 shows an optical microscopy image of MFC according to the present invention (magnification 40×, 0.17% by weight of MFC in water), wherein the MFC was obtained according to Example 1;

FIG. 3 shows a microscopy picture of MFC according to the present invention at a higher magnification (100×), same MFC concentration;

FIG. 4 shows a schematic drawing of the proposed mechanism for making MFC in accordance with the present invention, resulting in the 'brush-like' structure of the ends of the fibrils, as seen by means of optical microscopy.

DETAILED DESCRIPTION

Figure 5:
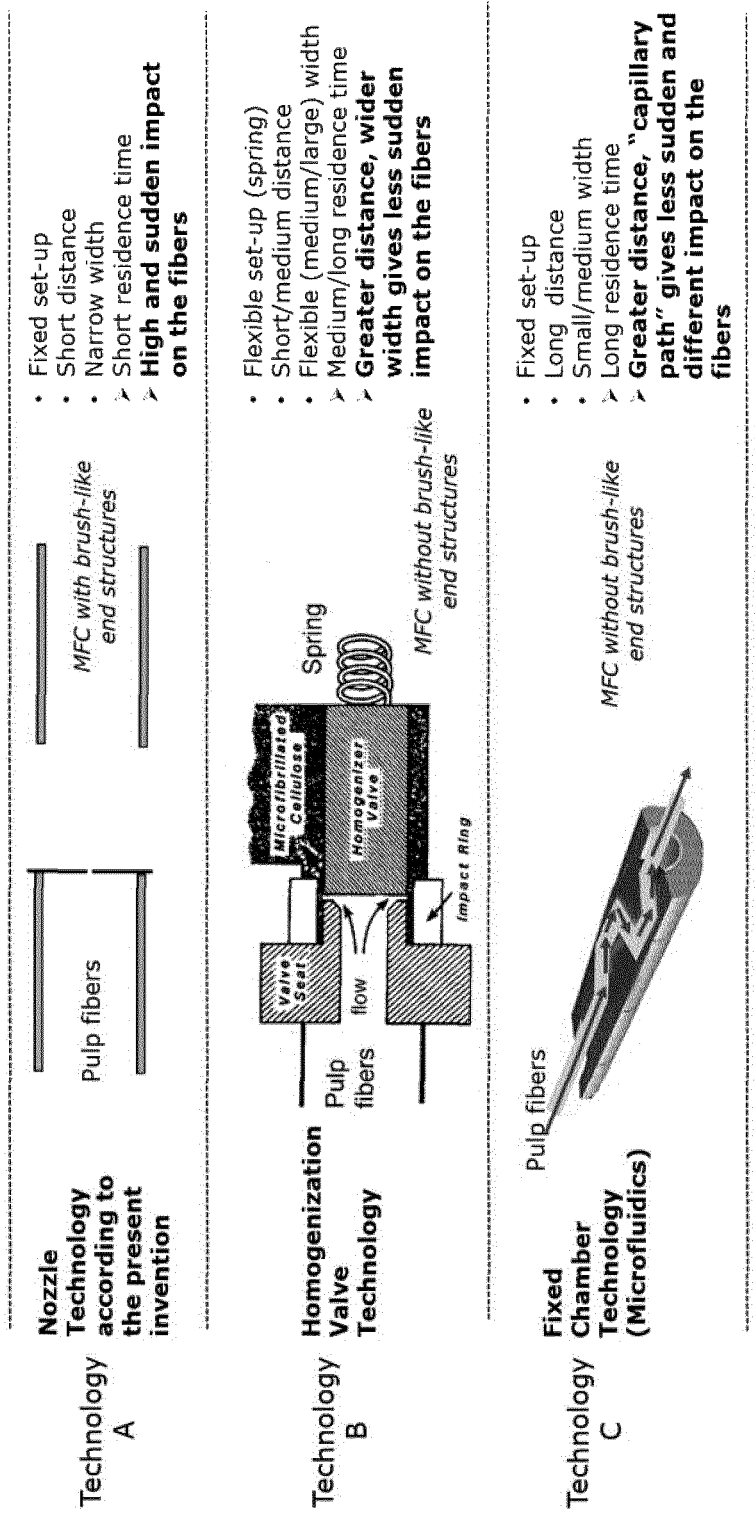
FIG. 5 shows three different methods how to make MFC; the uppermost panel (Technology A) shows a sketch of the process for making MFC in accordance with the present invention ('nozzle' technology), wherein cellulose pulp fibers are exposed to a high and sudden (velocity accelerating) impact. This is contrasted with two methods known from the art, in particular the Microfluidics 'fixed chamber' technology shown in FIG. 5 (Technology C), which provides for a longer pathway and therefore less sudden impact on the pulp fibers (image retrieved from product information provided by Microfluidics Inc., USA). Similarly, the homogenization valve technology shown in FIG. 5 (Technology B) 'expands' the cellulose pulp fibers in a less sudden and lower accelerating impact (image retrieved from Turbak et al., Journal of Applied Polymer Science: Applied Polymer Symposium 37, 815-827, 1983).

Process for the Manufacture of the MFC According to the Present Invention and MFC Obtainable by Such a Process In one aspect of the present invention, and solving the object(s) outlined above, the microfibrillated cellulose according to the present invention is prepared and obtainable by a process, which comprises at least the following steps:

(a) subjecting a cellulose pulp to at least one mechanical pretreatment step;

(b) subjecting the mechanically pretreated cellulose pulp of step (a) to a homogenizing step, which results in fibrils and fibril bundles of reduced length and diameter vis-à-vis the cellulose fibers present in the mechanically pretreated cellulose pulp of step (a), said step (b) resulting in microfibrillated cellulose;

wherein the homogenizing step (b) involves compressing the cellulose pulp from step (a) and subjecting the cellulose pulp to a pressure drop, by expanding the cellulose through at least one orifice, providing a pressure drop between a volume segment, preferably a chamber, that is located upstream of said orifice, and another volume segment, preferably a chamber, that is located downstream of said orifice, area, wherein said pressure drop is at least 1000 bar, preferably more than 2000 bar, preferably more than 2500 bar, further preferably more than 3000 bar, and wherein the cellulose fibrils are subjected to a turbulent flow regime in said volume segment, preferably a chamber, that is located downstream of said orifice.

The mechanical pretreatment step preferably is or comprises a refining step. The purpose of the mechanical pretreatment step, in accordance with the present process for manufacturing MFC, is to "beat" the cellulose pulp in order to increase the accessibility of the cell walls, i.e. to increase the surface area.

A refiner that is preferably used in the mechanical pretreatment step comprises at least one rotating disk. Therein, the cellulose pulp slurry is subjected to shear forces between the at least one rotating disk and at least one stationary disk.

Therefore, in accordance with the present invention, a process, or microfibrillated cellulose obtained or obtainable according to said process, is preferred, wherein the mechanical pretreatment step comprises subjecting the cellulose pulp to a refining step.

A particularly preferred embodiment relates to a process, or to microfibrillated cellulose obtained or obtainable by said process, wherein the refining step is repeated at least 5 times, preferably at least 10 times, further preferably at least 30 times.

Prior to the mechanical pretreatment step, or in addition to the mechanical pretreatment step, enzymatic (pre)treatment of the cellulose pulp is an optional additional step that may be preferred for some applications. In regard to enzymatic pretreatment in conjunction with microfibrillating cellulose, the respective content of WO 2007/091942 is incorporated herein by reference. Any other type of pretreatment, including chemical pretreatment, may also be included.

In the homogenizing step (b), which is to be conducted after the (mechanical) pretreatment step, in accordance with the present invention, the cellulose pulp slurry from step (a) is passed through a homogenizer at least once, preferably at least two times.

The homogenizer in accordance with the present invention is a high pressure homogenizer comprising at least one volume segment, preferably a chamber, which is located upstream of an orifice, at least one orifice having a small diameter, and at least one volume segment, preferably at least one chamber, which is located downstream of the orifice, in which the (microfibrillated) cellulose is subjected to an area of turbulent flow, i.e. a turbulence regime (i.e. a non-laminar flow).

In accordance with the present invention, the term "area of turbulent flow regime" refers to a flow regime, in which the flow is not predominantly characterized by a laminar flow regime.

Preferably, the Reynolds number, which is a dimensionless quantity delimiting the regime of predominantly laminar flow from the regime of predominantly turbulent flow (occurrence of lateral turbulences, vortices etc.), in said volume segment, preferably chamber, downstream of the orifice, is more than 100, preferably more than 1000, further preferably more than 2000, further preferably more than 10,000.

In accordance with the present invention, the term "orifice" means an opening or a nozzle contained in a homogenizer suitable for homogenizing cellulose, and having a defined or definable geometry, characterized, in particular, by a diameter or another suitable dimension.

In a preferred embodiment, the diameter of the orifice used in the homogenization step(s) is from 100 μm to 700 μm, further preferably from 200 μm to 500 μm.

In accordance with the present invention, the term "upstream" of a certain reference point means "before" said reference point in terms of the general direction of the fluid flow. Correspondingly, the term "downstream" of a certain reference point means "after" said reference point, in terms of the general direction of the fluid flow.

In contrast to conventional homogenizers where fibrillation of the cellulose fibers occurs by passing the cellulose fibers through homogenization chambers or valves (a detailed description of the conventional microfluidics process is given below and is shown in FIG. 5, Technology C), the fibrillation of the cellulose fibers in the homogenizer in accordance with the present invention occurs by compressing the cellulose in a chamber and passing the cellulose fibers through a small diameter orifice and a subsequent turbulence chamber. By passing the cellulose fibers through a small diameter orifice at a high pressure the cellulose fibers are subjected to a comparatively high accelerating impact.

The velocity of the cellulose pulp as determined immediately after said orifice is at least 200 m/s, further preferably more than 500 m/s and most preferably more than 700 m/s.

The residence time of a given flow segment comprising the cellulose fibers in the small diameter orifice, in accordance with the present invention, is comparatively short, preferably less than 20 microseconds, further preferably less than 10 microseconds and most preferably less than 2 microseconds.

In particular, the homogenizing step (b) involves compressing the cellulose pulp from step (a) and subjecting the cellulose pulp to a pressure drop, and thereby expanding the cellulose through said small diameter orifice and subjecting the cellulose fibers/fibrils to a subsequent turbulence flow volume segment by means of providing a pressure differential between said upstream volume segment and a downstream volume segment, with the orifice located between these two segments.

In accordance with the present invention, said pressure drop is at least 1000 bar, preferably more than 2000 bar, preferably more than 2500 bar, further preferably more than 3000 bar.

Preferably, said compression is achieved with a piston, acting inside a chamber containing the pretreated fibrils from step (a).

After passing through said homogenization step (b), the cellulose slurry is now "microfibrillated", i.e. fiber length and diameter are now significantly reduced compared to the fibers present in the initial cellulose pulp. As a result of this homogenization, 'fibrils' are formed. Also, in accordance with the present invention, the cellulose fibrils/fibril bundles now show bifurcations of the 'main' fibril into smaller secondary fibrils, at at least one of the two end points of the respective bundles and/or individual fibrils, preferably multiple bifurcations, i.e. the ends of the fibrils are multiply bifurcated.

'Main' fibril should be understood as the fibril with the largest cross-section within any fibril or fibril bundle that is discernible, in this context, in an optical microscope at a magnification of 40 times. 'Bifurcation' of fibril ends should be understood as the pattern at the end of such a main fibril with brush like appearance of smaller fibrils being partly released at one or two of the end points of a main fibril, but still being attached to the main core fibril. Both 'main' fibrils and their 'brush-like' end bifurcations are easily discernible in the optical microscopy pictures of FIGS. 2 and 3, both showing MFC in accordance with the present invention.

In a further embodiment, the present invention also relates to microfibrillated cellulose, obtainable and/or obtained by a process as described above. In accordance with the present invention, the microfibrillated cellulose is not characterized by the specific process parameters, but is a new product characterized by its hitherto unknown morphology, as discussed in the following.

MFC in Accordance with the Present Invention and its Morphology

The above-discussed objects, and other objects, are achieved by microfibrillated cellulose, in which:
i) the length and the diameter of the cellulose fibrils and fibril bundles are reduced vis-à-vis the respective length and diameter of the cellulose fibers and fiber bundles making up the cellulose that was used as a starting product;
ii) at least a fraction of the fibril bundles and individual fibrils of the microfibrillated cellulose, having reduced length and diameter, has bifurcations on at least one end of the main fibrils, into secondary fibrils, preferably bifurcations into three or more secondary fibrils, further preferably bifurcations into four or five or more secondary fibrils, wherein said secondary fibrils have a smaller diameter than the non-bifurcated main fibril, wherein the number of said (multiply) bifurcated ends of fibrils/fibril bundles is at least 60 (multiply) bifurcated ends of fibrils ("whiplash/brush like end structures") per mm$^2$, as measured in accordance with the optical light microscopy method as described herein, at a magnification of 40 times, preferably at least 80 (multiply) bifurcated ends of fibrils per mm$^2$, further preferably at least 100 or at least 140 (multiply) bifurcated ends of fibrils per mm$^2$.

Alternatively, these and other objects are achieved by microfibrillated cellulose, in which:
i) the length and the diameter of the cellulose fibrils and fibril bundles are reduced vis-à-vis the respective length and diameter of the cellulose fibers and fiber bundles making up the cellulose that was used as a starting product;
ii) at least a fraction of the fibril bundles and individual fibrils of the microfibrillated cellulose, having reduced length and diameter, has (multiple) bifurcations on at least one end of the main fibril into secondary fibrils, preferably bifurcations into three or more or four or more secondary fibrils wherein said secondary fibrils have a smaller diameter than the non-bifurcated main fibril,
wherein the ratio of the number of such (multiply) bifurcated ends of fibrils/fibril bundles ("whiplash/brush like end structures") of the microfibrillated cellulose in accordance with the present invention relative to the number of such (multiply) bifurcated ends of fibrils/fibril bundles of a reference microfibrillated cellulose, that has been homogenized in a conventional Microfluidics homogenizer, in accordance with the process as described herein, is at least 5, preferably at least 10, further preferably at least 15, wherein the number of (multiply) bifurcated ends of fibers/fibrils, fibril bundles is measured, for both types of microfibrillated cellulose, in accordance with the optical light microscopy method as described herein, at a magnification of 40 times.

Cellulose molecules in wood fibres are aggregated into fibrils. The cross-sectional dimension of the smallest fibrils (often termed 'elementary fibril') varies depending on the origin of the cellulose, and is, for example, about 2-4 nm for wood cellulose. These elementary fibrils are aggregated into microfibrils which are further aggregated into larger fibril bundles (sometimes termed 'macrofibrils') and finally into cellulosic fibres. The diameter of wood based fibres is typically in the range 10-50 µm (with the length of these fibres being even greater). When the cellulose fibres are microfibrillated, a heterogeneous mixture of "released" fibrils with cross-sectional dimensions and lengths in the range from nm to µm may result. Fibrils and bundles of fibrils typically co-exist in the resulting microfibrillated cellulose.

In cellulose, which is the starting product for producing microfibrillated cellulose (typically present as a "cellulose pulp"), no, or at least not a significant or not even a noticeable portion of individualized and "separated" cellulose fibrils can be found, for example by means of optical microscopy.

In the microfibrillated cellulose ('MFC') as described throughout the present disclosure, individual fibrils or fibril bundles can be found and easily discerned by way of conventional optical microscopy, at a magnification of 40× (see FIG. 1a, showing "conventional" MFC as obtained from a Microfluidics homogenizer as discussed in more detail below and as schematically shown in FIG. 5, Technology C). These fibrils and bundles of fibrils are also described as "(micro)fibrils". In accordance with the present invention, any reference to "fibrils" also includes bundles of such fibrils.

Using optical microscopy at a magnification of 40×, the morphology at the ends of the fibrils can be studied, as well as the fibril lengths and the degree of entanglements of fibrils in the MFC network structure, thus allowing for conclusions on how the morphology of the fibrils on that level determines the macrostructure of the MFC-material, which in turn is responsible for the physical properties as described in the present disclosure, in particular the water retention value and the rheological properties in PEG.

The magnification of 40× was chosen to have a reasonable amount of fibrils in the given area of the image to be counted, at the given concentration of the MFC-material. By means of optical microscopy, individual fibrils or fibril bundles or fibre fragments with cross sectional diameter larger than approximately 200 nm can be studied. Fibrils with cross-sectional diameter below this range cannot be fully resolved or seen, but will be present, coexisting with the fibrils or fibril bundles that can be resolved by optical microscopy as described herein.

The (micro)fibrils and their morphology is/are described, throughout the present disclosure, exclusively based on structures discernible at the microscopic level, i.e. as discernible by means of optical microscopy as described herein. The skilled person understands that additional structural and/or morphological information may be discernible at a higher magnification or by use of other methods, in particular by methods that have a better resolution.

Overall, irrespective of any structural and/or morphological features or information present at higher resolution, the present disclosure exclusively describes 'brush-like' end structures as discernible by means of optical microscopy as described herein.

In particular, throughout the present disclosure, the term 'fibril' is to be understood as relating to (aggregates of) cellulose molecules/fibrils with cross-sectional dimensions (diameters) from 2 nm to 1 µm, including both individual fibrils and fibril bundles. Fibril bundles or aggregates exceeding 1 µm in diameter are considered as 'residual fibre fragments' throughout the present disclosure.

In accordance with the present invention, the fibrils of the MFC preferably have a diameter in the nanometer range, and a length in the µm range.

In accordance with the present invention, a comparatively small portion of larger ('residual') cellulose fibers may still be present in the MFC product and may therefore coexist with the microfibrillated fibrils or fibril bundles.

The effects underlying the present invention, in particular the presence of brush-like end structures, are essentially independent of the concentration of the MFC in the solvent (here: water). However, for reference purposes, and as used in the Examples for quantification purposes and microscopy viewgraphs as used throughout the present disclosure, this concentration is set to be 0.17% by weight.

The conventional process as known from the art is based on the use of a so-called "microfluidizer". The Microfluidics homogenizer is one of the most efficient homogenizers known in the prior art. The principle of such a homogenizer known from the art is illustrated in FIG. 5 (Technology C).

In accordance with the present disclosure, the conventional fluidizer/homogenizer as used as a reference, is of the type "Microfluidizer M-110EH" as offered by Microfluidics Corp. and as commonly known in the field. An example of a homogenizing process utilizing a microfluidizer is described, for example, in application WO 2007/091942.

In the Microfluidizer as known form the art, the cellulose fiber suspension is subjected to a pressure differential by passing through Z- and/or Y-shaped channels, which are arranged within a chamber. The cellulose fiber suspension is typically passed through at least two Z- and/or Y-shaped channels with various diameters that are connected in series, firstly, typically one Z- or Y-shaped channel with a large diameter (for example 400 µm) and secondly, one Z- or Y-shaped channel with a small diameter (for example 100-200 µm) to avoid clogging of the smaller channels. The defibrillation of the cellulose fibers to fibrils and/or fibril bundles is achieved because of the pressure differential due to the small diameter in the channels and the turbulence created within the channels. Among other features, the presence of such Z- and/or Y-shaped channels in the homogenization step distinguishes the Microfluidics process from the homogenization process in the present invention.

A further distinguishing feature of the conventional Microfluidics process vis-à-vis the process of the present invention is that the residence time in any one of the Microfluidics channels/chambers is typically more than 20 microseconds, thereby subjecting the cellulose fibers to a pressure differential within a longer time interval compared to the homogenization process of the present invention.

Essentially all of the larger fibrils, fibril bundles and fiber residuals (above approximately 40 micron in length), of the MFC as manufactured in a conventional Microfluidics homogenizer and as viewed in an optical microscope at a magnification of 40× or 100× terminate in cleanly cut-off endpoints, in both fibril/fiber ends. The fibril bundles/fibrils of shorter length have predominantly non-bifurcated ends. Only a very few of these endpoints are bifurcated into smaller diameter (secondary) fibrils, and if bifurcated, only a low amount of bifurcations, typically one or two, is present. Even fewer, if any, of these endpoints are highly bifurcated into "brush-like" end structures (see the microscopy images of FIGS. 1a and b).

In contrast to the conventional MFC known from the art, as described above, and as illustrated in FIG. 2 (at a magnification of 40 times) and FIG. 3 (at a higher magnification, namely 100 times), in the MFC in accordance with the present invention, a significant part of the fibrils or fibril bundles of the MFC, as discernible in optical microscopy at a magnification of 40 times (and, in FIG. 3, 100 times), does not terminate in an end point, but the "main" fibril rather bifurcates at this end point, at least once, preferably two or more times, further preferably three or more times, further preferably five or more times into secondary fibril segments of a smaller diameter than the "main" fibril.

These novel microfibrillated fibrils then form a "whiplash"- or "comb"-like or "brush"-like end structure that is schematically illustrated in FIG. 4, along with a proposed mechanism, by which these novel structures may form.

The mechanism as shown in FIG. 4 is based on the fact that the cellulose fibers are subjected to a high pressure drop (ΔP of at least 1000 bar, preferably more than 2000 bar, preferably more than 2500 bar, further preferably 3000 bar) and a rapid increase in velocity from <10 m/s up to >700 m/s in a short time of only 1-2 microseconds, which is achieved by passing the slurry through a small diameter orifice.

In the chamber before the orifice, the cellulose fibers/fibrils are compressed and pressed together, and when the fibers/fibrils are straightened out while passing through the orifice, this occurs in such a short time segment that a whiplash effect is created.

As is also shown in FIG. 4, when the fiber/fibril is pressed through the orifice, the fiber/fibril is believed to be stretched, and when the last end is leaving the orifice it is with a snap which is breaking up the fiber/fibril end, creating multiple bifurcations or "lashes". The critical factor determining the whiplash effect is just how quick the force, i.e. pressure drop, is applied onto the fiber/fibril.

This proposed mechanism is only provided as an illustrative explanation and is not meant to indicate that this is necessarily the (only) applicable mechanism.

In accordance with the present invention, the number of fibrils, fibril bundles and cellulose fiber residuals per area (here: per 1 mm$^2$) showing (multiple) bifurcation at their end points is determined as follows: The MFC is diluted in water as the solvent, at a solids content of 0.17%. A droplet of this sample is put on a microscopy slide and an optical microscopy image of the individual fibrils, fibril bundles in solution is taken, at a magnification of 40×. A field of view of 0.14 mm$^2$ is chosen. Then, the number of bifurcations into two or more smaller fibril segments at at least one of their respective endpoint(s) is counted. A fibril is counted as one fibril showing such a bifurcation if a bifurcation is found at one end or at both ends. A further detailed description of this microscopy method is found in the "Examples"-Section below.

The number of "whiplash or brush like end structures" (multiply bifurcated end points) found for the microfibrillated cellulose according to the present invention can then be compared to the number of (multiply) bifurcated end points (including simple bifurcations) found for conventional microfibrillated cellulose, using the Microfluidics technology as defined above.

Without wishing to be bound by theory, it is believed that the "comb"-like or "brush"-like end structure of the fibrils or fibril bundles of the MFC according to the present invention provides increased stability to three-dimensional networks of fibrils enclosing water and thereby improving the water holding capacity of the resulting gel, and also increasing the viscosity at rest.

Without wishing to be bound by theory, it is believed that within the MFC (aggregate) macrostructure, as visible in optical microscopy as used throughout the present disclosure, the bifurcated/brush like end structures in the MFC of this invention contribute to 'nest' the fibrils, fibril bundles and aggregates more tightly together, and to build a more rigid and stable three-dimensional network measured as the improved rheological properties and the increased zero shear viscosity in particular, compared to conventional MFC. Furthermore, this tight three-dimensional network of the MFC of this invention may entrap or bind water more strongly within the aggregates, this MFC in accordance with the present invention, also comprising an increased surface area and a higher amount of reactive OH-groups being exposed to water through the highly bifurcated ends of the fibrils. This is demonstrated by the higher water retention properties of this novel MFC compared to conventional MFC.

Homogenizer in Accordance with the Present Invention

In a further embodiment, the present invention also relates to a homogenizer for use in the manufacture of microfibrillated cellulose (MFC), wherein the homogenizer is a high-pressure homogenizer suitable to subject a cellulose slurry to a pressure drop of at least 1000 bar, preferably more than 2000 bar, further preferably more than 2500 bar, further preferably more than 3000 bar, wherein said high-pressure homogenizer at least comprises the following components:
- at least one volume segment, preferably a chamber, which is located upstream of an orifice,
- at least one orifice,
- at least one volume segment, preferably at least one chamber, which is located downstream of the orifice, in which the (microfibrillated) cellulose is subjected to a turbulent flow regime.

The parameters and the components of the homogenizer are as described in the section above relating to the process of manufacture.

The homogenizer according to the present invention is further illustrated in FIG. 5 (Technology A).

Preferably, the homogenizer is used to manufacture the MFC according to the present invention.

Gel-Like Dispersion Comprising the MFC According to the Invention and Having Thixotropic Properties Once the MFC according to the present invention forms a dispersion with a solvent, this dispersion will have a gel-like behavior (showing a more pronounced solid-like behavior than a typical fluid behavior).

The viscous properties of a gel-like dispersion as formed in organic solvents are improved, using the MFC according to the present invention, vis-à-vis MFCs known from the art, in particular in regard to the zero shear viscosity. Without wishing to be bound by theory, it is believed that the three-dimensional networks of a MFC gel are stabilized by the "brushes"/"combs" at the ends of the fibrils, for the MFC according to the present invention, while these stabilized networks may be easily broken apart, once a shear force is applied, for example when the gel is to be transported (pumped) or the like.

In accordance with another embodiment of the present invention, a gel-like dispersion of the microfibrillated cellulose in accordance with the present invention is therefore characterized by the following features:
i) the length and the diameter of the fibrils and fibril bundles are reduced vis-à-vis the respective length and diameter of the cellulose fibers making up the cellulose that was used a starting product;
ii) the microfibrillated cellulose results in gel-like dispersion that has a zero shear viscosity, $\eta_0$, of at least 5000 Pa·s, preferably at least 6000 Pa·s, further preferably at least 7000 Pa·s, as measured in polyethylene glycol (PEG) as the solvent, and at a solids content of the MFC of 0.65%.

As already indicated above, the zero shear viscosity, $\eta_0$ ("viscosity at rest") is a measure for the stability of the three-dimensional network making up the gel-like dispersion. The zero shear viscosity, $\eta_0$, of the MFC according to the present invention is higher than the corresponding viscosity found for gel-like dispersions comprising MFC as known from the art (see "Results"-Section below).

The "zero shear viscosity" as disclosed and claimed herein is measured as described below in the "Examples" Section. Specifically, the rheological characterization of the MFC dispersions ("comparative" and "in accordance with the invention") was performed with PEG 400 as the solvent. "PEG 400" is a polyethylene glycol with a molecular weight between 380 and 420 g/mol and is widely used in pharmaceutical applications and therefore commonly known and available.

The rheological properties, in particular zero shear viscosity was/were measured on a rheometer of the type Anton Paar Physica MCR 301. The temperature in all measurements was 25° C. and a "plate-plate" geometry was used (diameter: 50 mm). The rheological measurement was performed as an oscillating measurement (amplitude sweep) to evaluate the degree of structure in the dispersions (values for the complex viscosity and the storage modulus $G'_{lin}$ are shown in the "Examples"-Section below) and as rotational viscosity measurements, in which case the viscosity was measured as a function of the shear rate to evaluate the viscosity at rest (shear forces→0), as well as the shear thinning properties of the dispersions.

Correspondingly, the present invention also relates to a gel-like dispersion as described above, i.e. a gel that comprises the MFC in accordance with the present invention as described above (characterized by its morphological properties and/or characterized by its zero shear viscosity), wherein the microfibrillated cellulose is preferably present, in the solvent, here in particular PEG, at a solid content from 0.01% to 10%, preferably 0.1% to 5%. Correspondingly, the solvent content in a gel-like dispersion according to the present invention is from 50% to 99%, preferably 60% to 95%.

The solvent in accordance with the present invention may be an organic solvent, in particular a polar organic solvent, which may be protic or aprotic. All solvents and adjuvants commonly used to prepare dispersions in the respective field (paints, coatings, cosmetics, home care, adhesives, pharmaceuticals, nutraceuticals) may be advantageously used with or in the gel according to the present invention or in order to prepare the gel according to the present invention.

In a preferred embodiment the organic solvent is chosen from alcohols, such as ethanol, glycerol and propylene glycol. In another preferred embodiment the solvent is chosen from polymeric solvent systems, such as polyethylene glycol and polypropylene glycol and/or from epoxy, acrylate and polyurethane based polymer systems, also including polyvinyl acetate or polyvinyl pyrrolidone.

The gel-like dispersion in accordance with the present invention is also characterized by the following properties/advantages: In one embodiment of the present invention, the $G'_{lin}$ value of the gel comprising the microfibrillated cellulose is more than 250 Pa, preferably more than 350 Pa.

In PEG as the solvent, the MFC according to the present invention also has a higher value for $G'_{lin}$ (storage modulus) than MFC as obtained in a conventional homogenizer (see the table 2 in the examples). The $G'_{lin}$ value provides an estimate for the "degree of structure" in the sample, the higher $G'_{lin}$, the higher the degree of structure. The value of $G'_{lin}$ is typically associated with the storage stability of the gel/dispersion, while the zero shear viscosity is usually associated with the stability of the gel/dispersion vis-à-vis sedimentation and in regard to storage stability.

Finally, as already indicated above, the present invention also relates to a gel-like dispersion, comprising the microfibrillated cellulose as disclosed above, or as obtained or obtainable by a process as described above, comprising microfibrillated cellulose, in a solvent, in particular in water or in PEG, at a solid content from 0.01% to 10%, preferably from 0.1% to 5%.

In accordance with the present invention, the microfibrillated cellulose has a water holding capacity (water retention capacity) of more than 75, preferably more than 80, further preferably more than 100. The water holding capacity describes the ability of the MFC to retain water within the MFC structure and this again relates to the accessible surface area. The water holding capacity is measured by centrifugation as described in more detail below in the "Examples"-Section.

Origin of the Cellulose Used to Prepare the MFC

In accordance with the present invention, there is no specific restriction in regard to the origin of the cellulose, and hence of the microfibrillated cellulose. In principle, the raw material for the cellulose microfibrils may be any cellulosic material, in particular wood, annual plants, cotton, flax, straw, ramie, bagasse (from sugar cane), suitable algae, jute, sugar beet, citrus fruits, waste from the food processing industry or energy crops or cellulose of bacterial origin or from animal origin, e.g. from tunicates.

In a preferred embodiment, wood-based materials are used as raw materials, either hardwood or softwood or both (in mixtures). Further preferably softwood is used as a raw material, either one kind or mixtures of different soft wood types.

Modified (Derivatized) and Non-Modified (Un-Derivatized) Cellulose/MFC

The microfibrillated cellulose in accordance with the present invention may be unmodified in respect to its functional groups or may be physically modified or chemically modified or both.

Chemical modification of the surface of the cellulose microfibrils is preferably achieved by various possible reactions of the surface functional groups of the cellulose microfibrils and more particularly of the hydroxyl functional groups, preferably by: oxidation, silylation reactions, etherification reactions, condensations with isocyanates, alkoxylation reactions with alkylene oxides, or condensation or substitution reactions with glycidyl derivatives. The chemical modification may take place before or after the defibrillation step.

The cellulose microfibrils can also be modified by a physical route, either by adsorption at the surface, or by spraying, or by coating, or by encapsulation of the microfibril. Preferred modified microfibrils can be obtained by physical adsorption of at least one compound. The MFC may also be modified by association with an amphiphilic compound (surfactant).

EP2408857 describes the process of making a surface modified MFC that is added to a curable viscous composition.

EXAMPLES

In the following, the properties of MFC in accordance with the present invention are compared to the properties of MFC known from the prior art, in particular MFC as produced with equipment known in the prior art (Microfluidics high pressure homogenizer). The Microfluidics high pressure homogenizer is one of the most efficient homogenizers known in the prior art. Such a fluidizer/homogenizer of the type "Microfluidizer M-110EH" is offered by Microfluidics Corp. and the use of such a homogenizer as commonly known in the field is described, for example, in application WO 2007/091942.

A simple mechanical pretreatment step was chosen over a more complicated chemical pretreatment step in order to clearly and more easily elucidate the differences found in the resulting products produced by the different homogenization processes. The mechanical pretreatment step was performed in the same manner for all examples. In fact, also the same starting materials were used for all Examples and the pretreated cellulose pulp entering the homogenizer was the same for all Examples. Any difference in the microfibrillated cellulose product is therefore based on differences in the processing in the homogenizer.

Example 1 (In Accordance with the Invention)

A MFC sample in accordance with the present invention was prepared as follows: cellulose pulp from Norwegian spruce (softwood) was first subjected to a refining step as outlined above, using a disk refiner. The cellulose pulp was passed through the refiner 40 times. Subsequently, the refined cellulose pulp was subjected to two homogenization steps in accordance with the present invention, under a high pressure differential of 3000 bar and using a 300 μm orifice, and subsequent treatment in a turbulence zone (after the orifice), resulting in a MFC material according to the present invention.

Dispersion in PEG400: 72.26 g MFC (1.8% dry content), was dispersed in PEG 400 (127.74 g) using a Dispermat® at 1500 rpm for 15 minutes. A MFC dispersion in PEG 400 containing 0.65% MFC and 35% $H_2O$ was thus prepared.

Example 2 (Comparative)

Example 1 was repeated using a conventional Microfluidics homogenization process where the refined cellulose pulp was passed through a 400 μm channel and a 100 μm channel at a pressure of 2000 bar. The homogenization step was repeated two times.

A MFC dispersion in PEG 400 containing 0.65% Microfluidics MFC and 35% $H_2O$ was prepared as described in Example 1

Example 3 (Comparative)

Example 1 was repeated using a conventional Microfluidics homogenization process where the refined cellulose pulp was passed through a 400 μm channel and a 100 μm channel at a pressure of 2000 bar. The homogenization step was repeated five times.

A MFC dispersion in PEG 400 containing 0.65% Microfluidics MFC and 35% $H_2O$ was prepared as described in Example 1.

Measuring Performance Characteristics: Rheological Parameters and Water Retention The rheological characterization of the MFC dispersions in PEG 400 was performed on a rheometer (Anton Paar Physica MCR 301). The temperature in the measurements was 25° C. and a "plate-plate" geometry was used (diameter: 50 mm). The rheological measurements were performed as an oscillating measurement (amplitude sweep) to evaluate the degree of structure in the dispersions (values for the complex viscosity and the storage modulus $G'_{lin}$ is given in Table 2 below) and as a rotational viscosity measurement, wherein the viscosity was measured as a function of the shear rate to evaluate the viscosity at rest (zero shear viscosity) and the shear thinning properties of the dispersions.

The water holding capacity was measured by diluting the MFC samples to a 0.3% solids content in water and then centrifuging the samples at 1000 G for 15 minutes. The clear water phase was separated from the sediment and the sediment was weighed. The water holding capacity is given as (mV/mT)−1 where mV is the weight of the wet sediment and mT is the weight of dry MFC analyzed.

Results

The MFC in accordance with the present invention displays advantageous water retention properties (see Table 1).

TABLE 1

Water holding capacity

| Example | Process | Water holding capacity |
| --- | --- | --- |
| #1 | In accordance with the invention | 120 |
| #2 (comparative) | Prior art (Microfluidics homogenizer) | 64 |
| #3 (comparative) | Prior art (Microfluidics homogenizer) | 71 |

Without wishing to be bound by theory, it is believed that improved water retention is due to the specific morphology of the MFC fibrils/fibril bundles, in accordance with the present invention, in particular due to the fact that the ends of the fibrils are partly or completely divided into smaller end segments, in particular in a "comb"-like or "brush"-like structure.

The process according to the present invention provides a highly defibrillated MFC material, resulting, among others, in a comparatively large surface area with a high number of available OH-groups. As can be seen from Table 1 the water holding capacity of MFC in accordance with the present invention (Example 1) is substantially higher than the water holding capacity of the MFC materials produced using a microfluidics homogenizer (comparative examples 2 and 3).

Further processing of the refined cellulose pulp by increasing the number of homogenization steps from two to five in the Microfluidics homogenizer (comparative examples 2 and 3, respectively), has not resulted in a significant increase in the water holding capacity of the MFC. This result corresponds with the expectation that it is the specific morphology and brush-like end structures of the fibrils/fibril bundles of the MFC in accordance with the present invention (Example 1) that provides the substantially higher water holding capacity as measured, compared to that of conventional MFC as described in the prior art.

The MFC in accordance with the present invention also has a very high drainage resistance. Therefore the standard methods for measuring water retention for cellulose like the JAPAN TAPPI No. 26, SCAN-C 62:00 or Tappi UM 256 cannot be used (as these standard methods include a filtration step), further differentiating the MFC from other MFCs as described in the prior art.

The MFC in accordance with the present invention also, and in particular, displays advantageous rheological properties in organic solvents/systems, such as polyethylene glycol (see Table 2).

TABLE 2

Rheological properties in polyethylene glycol

| Example | Process | Complex viscosity (Pa · s) | $G'_{lin}$ (Pa) | K | n | Zero shear viscosity ($\eta_o$, Pa · s) |
| --- | --- | --- | --- | --- | --- | --- |
| #1 | In accordance with the invention | 70 | 432 | 26 | 0.27 | 8283 |
| #2 (comparative) | Prior art (Microfluidics homogenizer) | 27 | 167 | 12 | 0.3 | 3800 |
| #3 (comparative) | Prior art (Microfluidics homogenizer) | 34 | 208 | 13 | 0.3 | 4637 |

In Table 2, several relevant rheological parameters are measured for MFC in polyethylene glycol, in accordance with the present invention, and are compared to the respective rheological parameters as measured for MFC produced in accordance with processes known from the prior art, which do not result in the specific morphology and/or performance parameters of the MFC of the present invention. Such MFC as known from the art may be obtained, for example by means of using a "microfluidics homogenizer" in the homogenization step (b).

Evaluation of the Inventive MFC's Morphology

In optical light microscopy (phase contrast microscopy, see FIGS. 1a and b, 2 and 3) it was observed that the inventive MFC microfibrils are morphologically different (defibrillated in a different manner, "whiplash/brush"-like end structures as discussed above) from the microfibrils in the material produced with the microfluidics homogenizer.

The samples of MFC fibrils as discussed above were dispersed at a solids content of 0.17% in water and viewed in an Olympus BX51 microscope by using phase contrast and magnifications ranging from 10 to 200 times. For counting and comparison purposes, a magnification of 40× was used.

For each of the MFC samples, two individual samples with a 0.17% solid content of MFC in water were prepared, and from each of these, 2-4 samples were prepared for imaging by placing a droplet on a microscope slide with size 1.5 (0.17 mm thick) glass cover slip. The samples were studied by an Olympus BX51 microscope at 40× magnification with phase contrast. The magnification of 40× was chosen to have a reasonable amount of fibrils/fibril bundles in the given area to be counted (see further details in regard to the evaluation of the number of "brushes" as discussed below). Using this magnification, the whiplash/brush like end structures are well visible and it is possible to also count the <10 micron fibrils/fibril bundles, wherein the 10 micron refers to the length of the fibrils/fibril bundles.

The location of the images taken on the sample (drop of MFC dispersion in water on a microscope slide) was chosen randomly, providing images representing a reasonably large amount of fibrils, and up to eight images are taken for each sample preparation. By using AnalySIS Soft Imaging System, a grid of 500×500 pixel (=1 square), was drawn onto the images, each image comprising in total 2000 pixel height×2500 pixel width (=20 squares (4×5)). The number of whiplash/brush like end structures was counted inside the grid of 500×500 pixel, counting a total area of 2000×2500 pixel for each image, counting 5-12 images or 100-240 squares of 500×500 pixels for each sample dilution of 0.17% MFC.

In case a bifurcation is found at one end of a fibril, this was counted as one occurrence of a "brush", and if a bifurcation was found at both ends, this was counted as two brushes. Bifurcations along/in the middle of the fibrils were not counted. The average number of whiplash/brush like end structures was then calculated for an area of 2000×2500 pixel, or by using the scale bar of the imaging system 200 micrometers=1200 pixel; for area of approximately 0.139 mm². The standard deviation of the average number brush like end structures was also evaluated. The ratio of the number of brush like end structures in the MFC according to the invention relative to the conventional Microfluidizer MFC sample is then calculated as shown below.

TABLE 3

Evaluation of the MFC morphology by microscopy

| Example | Process | Average number of "brush" end structures found | Standard deviation | Ratio of "brushes" of inventive MFC vis-à-vis "Microfluidizer" MFC |
|---|---|---|---|---|
| #1 | In accordance with the invention | 22.2 | 5.4 | 18.5 |
| #1 | In accordance with the invention | 21.0 | 5.8 | 17.5 |
| #2 (comparative) | Prior art (Microfluidics homogenizer) | 1.2 | 0.8 | N/A |
| #1 | In accordance with the invention | 36.3 | 12.0 | 17.3 |
| #2 (comparative) | Prior art (Microfluidics homogenizer) | 2.1 | 1.9 | N/A |

As seen in Table 3 above; the first counting gave, on average, 22.2 and 21 whiplash/brush like end structures for the MFC in accordance with the present invention (Example 1), per area of 2000×2500 pixels or ca. 0.14 mm² randomly selected and imaged sample.

By contrast, the conventional MFC sample from the Microfludics homogenizer (Example 2) gave, on average, 1.2 brush-like structures at the ends, meaning that conventional MFC has very little or almost no brush-like structures at the fibril's ends. This applies all the more, since, in general, many of bifurcated end structures counted for the conventional MFC are different from the MFC in accordance with the present invention, in the sense that they have only a few, often only one or two bifurcations. Conventional MFC is also often "hairy" along the length of the fibril and bifurcations at the end are not observed for fibrils/fibril bundles longer than 40 microns. In the conventional Microfluidizer MFC, the fibrils/fibril bundles of larger size are mostly cut in a straight manner on both ends. Irrespective of this fact that many, if not most of the "brushes" of the conventional MFC, are only slightly or weakly bifurcated, these structures were nevertheless counted as "brushes".

In a second round of determining the number of "brushes" (last two lines of the table above), more of the less visible and more uncertain small fibril brush end structures were included in the count, by means of focussing on areas that are not well resolved, and therefore, the overall numbers of "brushes" counted was higher. However, the relevant relative result (between 17-19 times more "brushes" for the MFC in accordance with the present invention vis-à-vis the conventional MFC) was unaffected by this refined counting method.

Another interesting difference in morphology is that the MFC aggregate structure of the conventional "Microfluidizer" MFC is more "open" than of the MFC in accordance with the present invention. The brush like end structures present in the inventive MFC contribute to "nest" the fibrils and aggregates together (see FIG. 3), to build a tighter network and to entrap water or bind water more strongly within the aggregates. This morphology effect is also measured as a higher water retention value, as discussed above.

The invention claimed is:

1. Microfibrillated cellulose, in which:
   i) the length and the diameter of the cellulose fibrils and fibril bundles are reduced vis-à-vis the respective length and diameter of the cellulose fibers and fiber bundles making up the cellulose that was used as a starting product;
   ii) at least a fraction of the fibril bundles and individual fibrils of the microfibrillated cellulose, having reduced length and diameter, has bifurcations on at least one end of the main fibrils into secondary fibrils, wherein said secondary fibrils have a smaller diameter than the non-bifurcated main fibril,
   wherein the number of said bifurcated ends of fibrils/fibril bundles is at least 60 bifurcated ends of fibrils per mm², as measured with an optical light microscopy at a magnification of 40 times and as measured at a solids content of 0.17% of microfibrillated cellulose in water.

2. The microfibrillated cellulose of claim 1, wherein the number of the bifurcated ends of fibrils/fibril bundles is at least 100 bifurcated ends of fibrils per mm.

3. Microfibrillated cellulose, in which:
   i) the length and the diameter of the cellulose fibrils and fibril bundles are reduced vis-à-vis the respective length and diameter of the cellulose fibers and fiber bundles making up the cellulose that was used as a starting product;
   ii) at least a fraction of the fibril bundles and individual fibrils of the microfibrillated cellulose, having reduced length and diameter, has multiple bifurcations on at least one end of the main fibril into secondary fibrils, wherein said secondary fibrils have a smaller diameter than the non-bifurcated main fibril,
   wherein the ratio of the number of such bifurcated ends of fibrils/fibril bundles of the microfibrillated cellulose relative to the number of such bifurcated ends of fibrils/fibril bundles of a reference microfibrillated cellulose is at least 5,
   wherein the reference microfibrillated cellulose has been homogenized by
   a) subjecting a cellulose pulp to at least one mechanical pretreatment step; and
   b) passing the mechanically pretreated cellulose pulp of step (a) through a 400 μm channel and a 100 μm channel at a pressure of 2000 bar;

wherein the number of bifurcated ends of fibrils/fibril bundles is measured by optical light microscopy at a magnification of 40 times, and as measured at a solids content of 0.17% of microfibrillated cellulose in water.

4. Gel-like dispersion of the microfibrillated cellulose according to claims 1 or 3, comprising microfibrillated cellulose at a solid content from 0.01% to 10%, wherein the microfibrillated cellulose is dispersed in PEG400 or water.

5. The microfibrillated cellulose of claim 4, wherein the solid content of the microfibrillated cellulose is from 0.1% to 5%.

6. The microfibrillated cellulose of claim 3, wherein one of the multiple bifurcations comprises three or more secondary fibrils.

7. The microfibrillated cellulose of claim 3, wherein the ratio of the number of such bifurcated ends of fibrils/fibril bundles of the microfibrillated cellulose relative to the number of such bifurcated ends of fibrils/fibril bundles of the reference microfibrillated cellulose is at least 15.

8. Microfibrillated cellulose comprising:
i) a dispersion of said microfibrillated cellulose comprising fibrils and fibril bundles and having a zero shear viscosity, $\eta_0$, of at least 5000 Pa·s in PEG400, as measured at a solids content of the microfibrillated cellulose of 0.65%, wherein;
ii) the length and the diameter of the fibrils and fibril bundles of the microfibrillated cellulose are reduced vis-à-vis the respective length and diameter of cellulose fibers and fiber bundles making up a cellulose that was used a starting product; and
iii) at least a fraction of the fibrils and fibril bundles of the microfibrillated cellulose comprises bifurcations on at least one end of main fibrils into secondary fibrils, wherein the secondary fibrils have smaller diameters than the non-bifurcated main fibril.

9. Microfibrillated cellulose according to claim 8, wherein a storage modulus $G'_{lin}$ of a gel-like dispersion comprising the microfibrillated cellulose in PEG400 is more than 250 Pa, as measured at a solids content of the microfibrillated cellulose of 0.65%.

10. Microfibrillated cellulose according to any one of claim 1 to claim 9, having a water retention, of at least 80, wherein the water retention is measured by diluting the MFC samples to a 0.3% solids content in water and then centrifuging the samples at 1000 G for 15 minutes, wherein the clear water phase is separated from the sediment and the sediment is weighed, wherein the water holding capacity is given as (mV/mT)−1, where mV is the weight of the wet sediment and mT is the weight of dry microfibrillated cellulose analyzed.

11. The microfibrillated cellulose of claim 10, wherein the water retention is at least 100.

12. The microfibrillated cellulose of claim 9, wherein the storage modulus $G'_{lin}$ value is more than 350 Pa.

13. The microfibrillated cellulose of claim 7, wherein the zero shear viscosity is at least 7000 Pa·s.

* * * * *

UNITED STATES PATENT AND TRADEMARK OFFICE
CERTIFICATE OF CORRECTION

PATENT NO. : 10,337,146 B2  
APPLICATION NO. : 15/311730  
DATED : July 2, 2019  
INVENTOR(S) : Synnøve Holtan et al.

Page 1 of 1

It is certified that error appears in the above-identified patent and that said Letters Patent is hereby corrected as shown below:

In the Claims

Column 20, Line 27 (Claim 13) please replace:
"The microfibrillated cellulose of claim 7"
With:
--The microfibrillated cellulose of claim 8--

Signed and Sealed this
Twenty-seventh Day of August, 2019

Andrei Iancu
*Director of the United States Patent and Trademark Office*